United States Patent Office 3,423,666
Patented Jan. 21, 1969

3,423,666
ELECTRICAL CONTROL SYSTEMS
Walter J. Brown, 71 Gurley Road,
Stamford, Conn. 06902
Original application Feb. 19, 1965, Ser. No. 433,863, now Patent No. 3,378,747, dated Apr. 16, 1968. Divided and this application Oct. 30, 1967, Ser. No. 705,241
U.S. Cl. 321—11    9 Claims
Int. Cl. H02m 1/18

ABSTRACT OF THE DISCLOSURE

An electrical control system comprises a controlled rectifier supplying an inductive load and having an output which varies according to the current flow in a back rectifier which is connected across the load. The system will alternatively or additionally regulate the output, limit the maximum output current, and interrupt the output current when excessive.

---

This invention generally relates to circuits using a controlled rectifier and more specifically to rectifiers energized from an alternating current source and supplying output power to an inductive load. The invention is particularly well adapted to circuits which use a single phase half wave controlled rectifier delivering a unidirectional current to an inductive load.

This application is a divisional application of my copending application for U.S. Letters Patent Ser. No. 433,863 filed Feb. 19, 1965 entitled "Electrical Control Systems," now U.S. Patent No. 3,378,747, dated Apr. 16, 1968.

Quite specifically, the invention has application to the variable control of unidirectional power supplied through a half wave controlled rectifier to a rotating machine which has substantial inductance such as a series wound or universal motor or the field winding of the generator of a Ward Leonard type variable speed drive, or the excitation winding of an eddy current or hysteresis clutch or coupling, or in some cases the field or armature of a separately excited motor.

The output of a half wave controlled rectifier supplying an inductive load can be increased by connecting a back rectifier across the load, whereby the back rectifier permits current to continue flowing in the load after the controlled rectifier has ceased to conduct at the end of each positive half cycle of the alternating voltage supply.

As is well known to those skilled in the art, a back rectifier or diode is otherwise known also as a free-wheeling rectifier or diode. It is basically connected in parallel with the load and in series opposition to a controlled rectifier across the alternating current source.

It is a characteristic of such circuits that when the controlled rectifier is conducting only for a small fraction of the positive half cycle and thus delivering a small output, the back rectifier passes a larger proportion of the total load current than it does when the output of the controlled rectifier is increased by advancing its firing angle and increasing its conduction period.

According to this invention, the current flowing in a back rectifier connected across an inductive load supplied through a half-wave controlled rectifier is passed through a control element affects the output of the controlled rectifier.

Since the proportion of the load current which flows through the back rectifier is greater at small outputs than at large output, the said control element has a greater effect at low output voltage than at high output voltage.

In one arrangement of this invention, the control element comprises a winding on a magnetic control device, which winding is connected in series with the back rectifier, the current in said winding advancing the firing angle of the controlled rectifier as the load current increases. This has been successfully reduced to practice for improving the regulation of series wound or universal motors, especially at low speeds, by increasing the output of the controlled rectifier in accordance with the back rectifier current as the motor current increases due to increased mechanical load on the motor.

At low speeds the conduction angle of the controlled rectifier is usually small, and a given increase in motor load current will produce a relatively large increase in the back rectifier current and a correspondingly large advance in the firing angle. This large advance is highly desirable since the instantaneous amplitude of the alternating voltage input is low at small conduction angles, as will be later explained. At higher speeds, with a firing angle around 90 degrees, the back rectifier passes less current than at low speeds, and accordingly a given increase in motor load current produces a relatively small advance in the ignition angle; this is also desirable, since the instantaneous amplitude of the applied alternating voltage is high at any firing angle around 90 degrees. By suitable design, the increase in output to the motor may be matched to its demand so as to provide good speed regulation over a wide range of load and speed.

In another arrangement of the invention, the back rectifier current is passed through a control element in the form of a winding on a magnetic control device, the current in which winding tends to retard the firing angle of the controlled rectifier as the back rectifier current is increased. However, this retarding action is inhibited by connecting the said winding in series with a diode between a source of unidirectional reference voltage and a source of feedback voltage such as a resistor in series with the back rectifier. This winding then has no effect on the firing angle of the controlled rectifier until the feedback voltage increases and exceeds the reference voltage, thereby causing the diode to conduct. Any further increase in the feedback voltage due to increased back rectifier current then causes the diode to conduct and causes the winding to inhibit further advancing of the firing angle of the controlled rectifier and thus to limit the current delivered to the load.

This current-limiting effect occurs at lower load currents with low output voltage than at high output voltage, since the effect is dependent upon the back rectifier current. This discriminatory feature of the current-limiting effect is particularly useful in the protection of rotating machines which are more prone to overheating with a given current at low speeds than at high speeds.

Furthermore, when the load comprises a series wound or universal motor, this arrangement will, in general, limit the current to a lower value with a motor having a low current rating than with a motor having a larger current rating; this is due to the fact that a motor of given voltage with a low current rating has a higher inductance than a motor having a larger current rating, and accordingly the back rectifier current is a larger proportion of the total current in the case of a motor of lower current rating.

In a further arrangement of the invention, an overload relay is energized by connecting its control terminals so as to be energized in accordance with the back rectifier current, while it directly or indirectly opens the total load current circuit, or at least the controlled rectifier circuit, when the back rectifier current reaches a predetermined value.

Since this predetermined value of back rectifier current will be reached at a lower total load current with low load voltage than with high load voltage, this feature is particularly useful for the protection of electrical machinery, which will overheat at lower currents at low speed and low voltage than at high speed and high voltage.

Furthermore, the overload relay will, in general, open the output circuit to a series wound or universal motor at a lower motor current with a motor having a low current rating than with a motor having a higher current rating; this is because a motor having a low current rating normally has a higher inductance than a motor having a higher current rating, and consequently the back rectifier current is a higher proportion of the total load current with a motor of low current rating.

The overload relay may be of the manual resetting type or alternatively of the automatic resetting type; in the latter case, the relay may be held in an energized condition, to prevent hap-hazard and possibly dangerous reclosing, by means of a holding circuit which continues to energize the relay after it has opened the load circuit; a pilot lamp may be connected to the holding circuit to indicate when the overload relay is open.

The overload relay may be arranged directly to interrupt the total load current or the anode current of the controlled rectifier. Alternatively, it may be arranged to interrupt only the firing signal which normally initiates conduction of the controlled rectifier so that its anode circuit ceases to conduct appreciable current.

The overload relay may be of the electro-mechanical type having moving contacts with an operating coil or heater. Alternatively, it may comprise a solid state device such as a transistor or a gate controlled switch.

Figure 1:
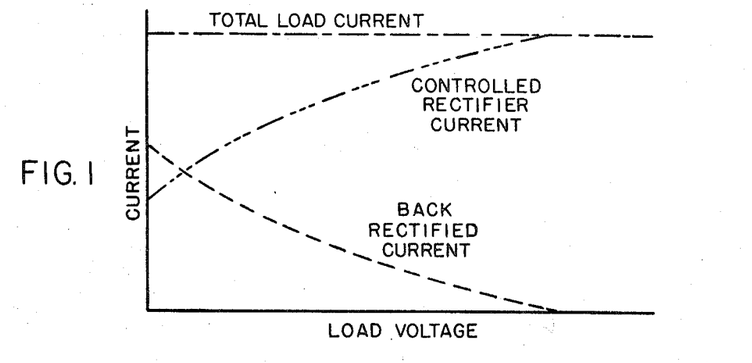
FIG. 1 is a graph showing the typical relationship of controlled rectifier current to back rectifier current.

FIG. 1 shows a typical example of the relative currents in a controlled rectifier supplying an inductive load such as a universal motor and in a back rectifier connected across said load. For a given total load current, as will be seen, the back rectifier takes a large proportion of the total load current when the load voltage is reduced by retarding the firing angle of the controlled rectifier; this proportion decreases as the load voltage is increased by advancing the firing angle.

Figure 2A:
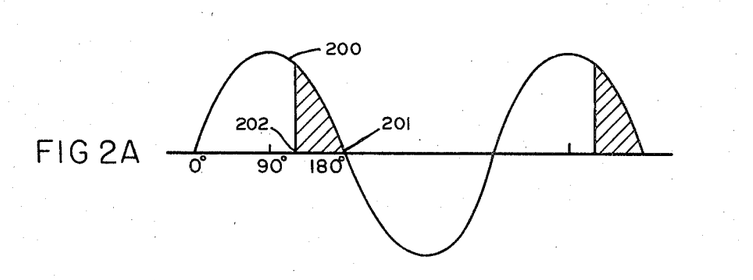
FIGS. 2(a) and 2(b) are schematic wave shapes which illustrate the desirability of greater change in firing angle at low output voltages.
Figure 2B:
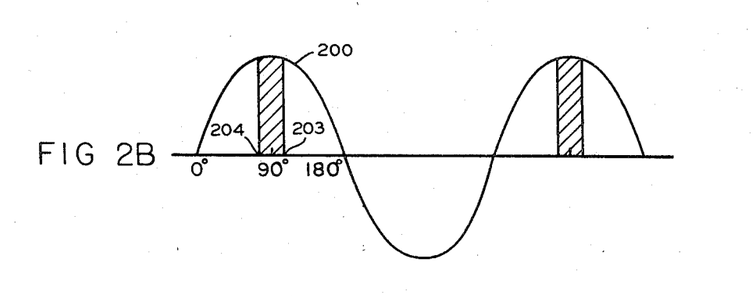

FIGS. 2(a) and 2(b) show that for equal increments of output, shown by the shaded areas, a greater advance of firing angle is required at the latter portion of each half cycle than at the mid portion thereof. For the same applied sine wave alternating voltage 200, an advance in firing angle from angle 201 to angle 202 of approximately 60 degrees in FIG. 2(a) produces the same increment of output, as indicated by the shaded area, as an advance from angle 203 to angle 204, of approximately 30 degrees in FIG. 2(b). In other words, to obtain a desirable linear relationship of output with firing angle, the firing angle should be advanced about twice as rapidly with low output, as FIG. 2(a), than with medium output as FIG. 2(b).

It will be noted in FIG. 1 that the back rectifier current at low output voltage is approximately twice the back rectifier current at medium output voltage. This is the phenomenon of which I make use in this invention.

Figure 3:
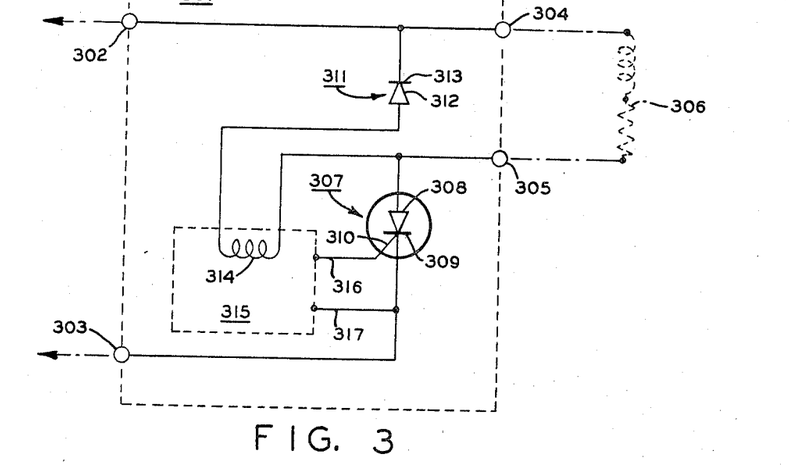
FIG. 3 is a schematic circuit diagram showing the basic form of the present invention.

FIG. 3 illustrates the basic form of my invention. The rectangle 301, shown in broken lines, outlines a closed loop control system for connection to an alternating current source at its input terminals 302 and 303. It provides an output at terminals 304 and 305 for connection to an inductive load 306. A controlled rectifier 307 such as a silicon controlled rectifier, or SCR, has an anode 308, a cathode 309, and a gate or control electrode 310. A back rectifier 311, having an anode 312, and a cathode 313, is connected, in series with a control element shown as a winding 314, across the load 306, through output terminals 304 and 305.

The control element 314 is coupled with a control means shown in broken lines as the rectangle 315. The control means shown in broken lines as the rectangle 315. The control means is connected through conductors 316 and 317 to the gate 310 and the cathode 309 of the controlled rectifier 307. The control means 315 is arranged in any of the known ways to deliver a current pulse to the gate 310 during each cycle of the alternating current supply, so as to fire the controlled rectifier 307 and initiate its conduction from anode 308 to cathode 309 at a specific phase angle during each cycle, which is usually referred to as the firing angle. The control means 315 is arranged to vary the firing angle, and the corresponding output of the controlled rectifier 307, in dependence upon the current which is passed by the back rectifier 311 and the control element 314.

Figure 4:
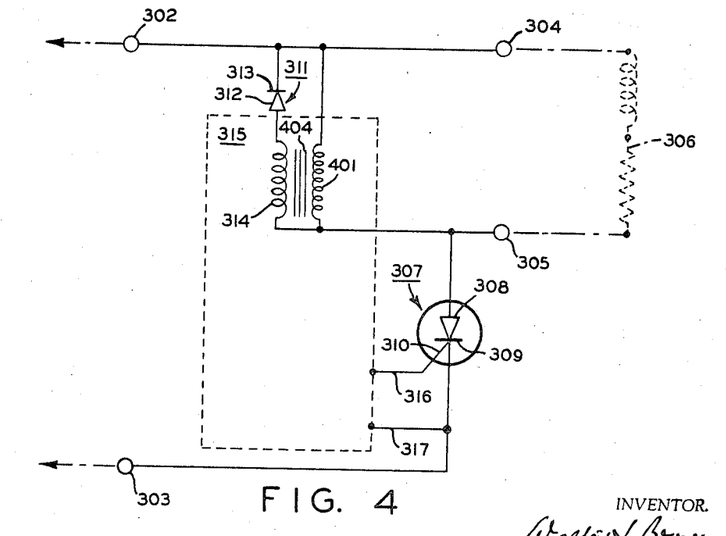
FIG. 4 is a schematic diagram showing the application of this invention to the regulation of load voltage in relation to load current.

FIG. 4 illustrates another circuit arrangement which provides an output voltage which is dependent upon the output current. Many of the circuit elements are similar to those in FIG. 3 and these are similarly numbered and their descriptions will not be repeated.

In FIG. 4 the control means 315 includes an additional control element 401 which is connected between the output terminals 304 and 305. Accordingly, the control element 401 senses the output voltage to the load, while the control element 314 senses the current through the back rectifier 311. The two control elements are coupled by winding them on a magnetic core 404 which forms a part of the control means 315 for the purpose of firing the gate 310 of the controlled rectifier. The output voltage from the controlled rectifier to the load is determined by the difference between the ampere turns of the voltage-sensing winding 401 and the back rectifier current-sensing winding 314; accordingly, the output voltage is a predetermined function of the load current.

Figure 5:
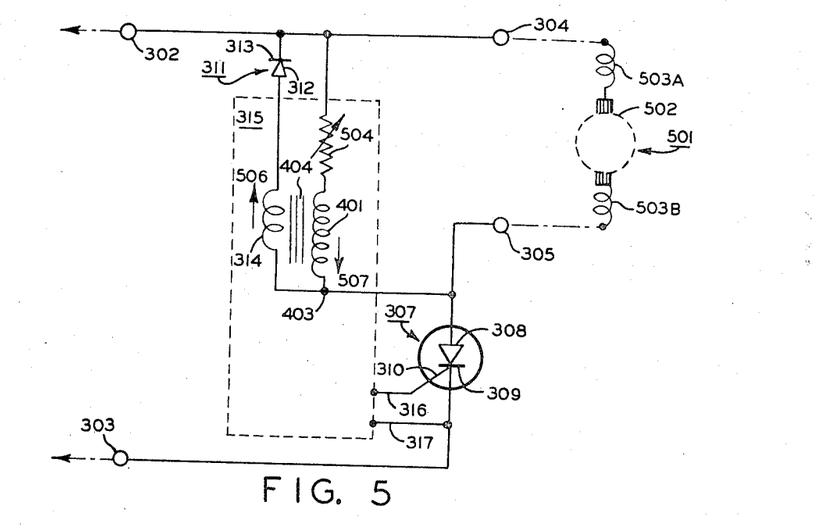
FIG. 5 is a schematic diagram showing the invention as used for the adjustable speed regulation of a series wound or universal motor.

FIG. 5 depicts an arrangement of the invention for adjusting and regulating the speed of a series wound or universal motor 501, having an armature 502 serially connected through field windings 503A, 503B, across the output terminals 304 and 305. Many of the circuit elements are similar to those of previous figures and are similarly numbered, and their descriptions will not be repeated.

In FIG. 5, the voltage-sensing winding 401 is connected in series with an adjustable resistor or rheostat 504 across the output terminals 304 and 305. By adjusting this rheostat the unidirectional output voltage which is needed to develop a given number of ampere-turns in winding 401 in the direction of the arrow 507 may be adjusted in order to adjust the speed of the motor 501; by increasing the resistance of said rheostat the given number of ampere-turns will require a higher output voltage, corresponding to a greater motor speed.

The current-sensing winding 314 is designed to develop opposing ampere-turns in the direction of the arrow 506, and the difference between the ampere turns in windings 401 and 314 varies the firing angle of the controlled rectifier 307 and determines the speed of the motor under any specific loading conditions.

The motor speed is dependent upon the output voltage, which in turn is dependent upon the setting of the rheostat 504, and upon the current in the back rectifier 311 and the current-sensitive winding 314. As the motor load is increased, the back rectifier current, through winding 314, is increased, at first rapidly and then less rapidly, and accordingly the firing angle is advanced, at first rapidly and then less rapidly. By suitable design, the increments of firing angle advance corresponding to equal increments of total motor current may be caused to produce approximately equal increments of output voltage, as shown by the shaded areas in FIGS. 2(a) and 2(b), at least until the firing angle has passed the 90° point. By suitable proportioning of the turns on the current-sensing winding 314 and the opposing voltage-sensing winding 401, the increments of output voltage with increasing motor load current may be arranged to be of such value as to regulate the motor speed and hold it substantially constant over a wide range of load.

I have found it possible to regulate the motor speed closely down to very light loads, due to the higher rate of change of firing angle caused by the high rate of change of back rectifier current at light load.

I have also found that the same circuit component values will adequately regulate the speed of a wide range of motor sizes, for instance from sewing machine motors having a rating of 1 ampere, through electric hand tools having a rating of 3 amperes. This unexpected and useful discriminatory effect is undoubtedly due to the smaller motors having a higher inductance which increases the ratio of back rectifier current to total motor current.

Figure 6:
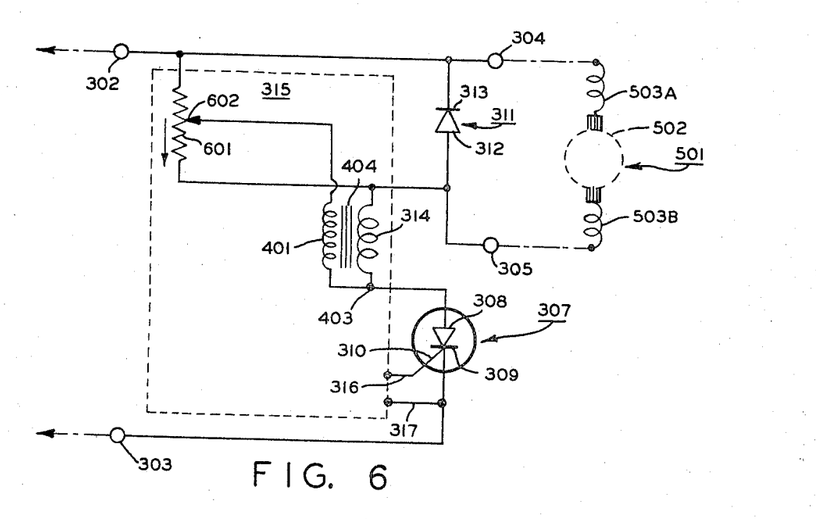
FIG. 6 is a schematic circuit diagram showing the invention used for adjustable speed regulation of a series wound or universal motor.

FIG. 6 shows a further arrangement of my invention which I have found to be very useful for the control of series wound or universal motors over a wide range of speeds. Many of the circuit elements are similar to those previously described, and they are similarly numbered so their description will not be repeated.

FIG. 6 is generally similar to FIG. 5, except that the speed is adjustable by means of a potentiometer 601 which is connected across the back rectifier 311; one end of potentiometer 601 is connected to the cathode 313 of the back rectifier; the other end of potentiometer 601 is connected to the anode 312 of the back rectifier. The potentiometer has a tap 602 which is connected through the voltage-sensing winding 401 to the anode 308 of the controlled rectifier 307. The speed can be adjusted over a wide range by moving the tap 602 so as to vary the ampere turns in the voltage-sensing winding 401, and the speed can be regulated over a wide range of motor current by the inherent variation of ampere turns with current in the current-sensitive winding 314. Regulation is particularly good at slow speeds, since the winding 314 senses the back rectifier current which is predominant at slow speeds.

Figure 7:
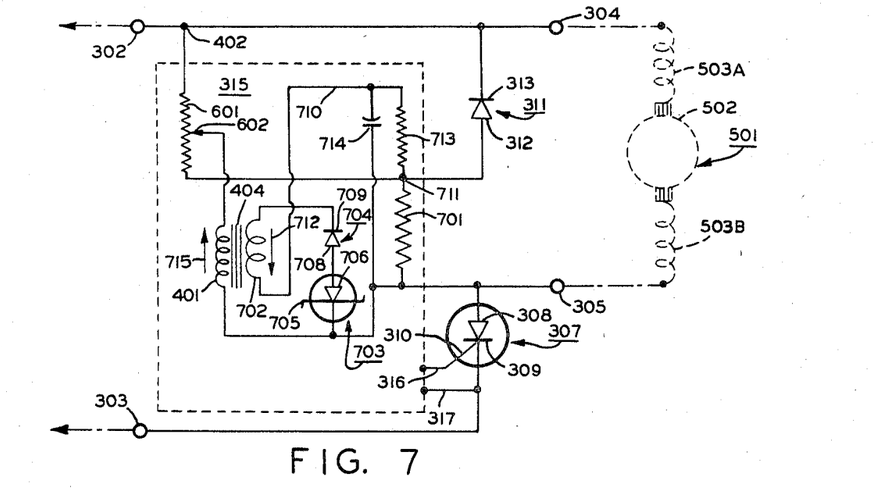
FIG. 7 is a schematic diagram showing the invention as applied to current limiting purposes.

FIG. 7 shows the application of my invention to current limiting. Many of the circuit elements are similar to those previously described, and they are similarly numbered, so their descriptions will not be repeated.

In the arrangement of FIG. 7, an impedance 701, shown typically as a resistor, is connected in series with the back rectifier 311 for the purpose of sensing the back rectifier current. A winding 702 on the magnetic core 404 is connected through a filter resistor 713 across the current-sensing impedance 701 in series with a diode 704 and a voltage reference source comprising a Zener diode 703. The cathode 705 of the Zener diode 703 is connected to the positive end 707 of the impedance 701, in such a sense as to oppose the voltage drop across the impedance 701. The Zener anode 706 is connected to the anode 708 of the diode 704, the cathode 709 of which is connected to the upper end of the winding 702. The lower end of the winding 702 is connected through the filter resistor 713 to the upper end 711 of the current-sensing impedance 701. A filter capacitor 714 is connected from conductor 710 to terminal 707 of the impedance 701.

Under normal load conditions, the filtered voltage drop across the impedance 701 is insufficient to overcome the Zener threshold voltage, and only a negligible leakage current flows through the winding 702. When back rectifier current exceeds a predetermined value, dependent on the load current and on the load voltage, the filtered voltage developed across the impedance 701 is sufficient to overcome the Zener voltage, and current flows from the positive end 707 of the impedance 701 through the Zener diode 703 and the normal diode 704 and thence through the winding 702 and conductor 710 and filter resistor 713 to the negative end 711 of the impendance 701. The direction of magnetization of the core 404 by the winding 702 is in the opposite direction to the magnetization by the speed-regulating winding 401, as shown by the arrows 712 and 715. Accordingly, the current in winding 702 tends to retard the firing angle of the controlled rectifier 307 and to inhibit any further increase of load current between the output terminals 304 and 305. The filter, comprising resistor 713 and capacitor 714, improves the steepness of current-limiting by presenting a reasonably uniform D.C. voltage for comparison against the D.C. supporting voltage of the Zener diode.

The load is shown as a series wound or universal motor, since the novel method of limiting the load current in accordance with the back rectifier current is of particular value in the case of a motor load. At slow speeds, a given "limiting" back rectifier current is produced when supplying a relatively small total load current equal to say 2 or 3 times the back rectifier current; accordingly, the total load current is limited to a relatively small value when the motor is running at slow speed and when the cooling effect due to rotation of the motor, with or without a fan, is relatively poor. At high speeds, on the other hand, when the motor cooling effect is much greater, the motor current corresponding to the same "limiting" back rectifier current may be 5 to 10 times as great as the back rectifier current; therefore, a much larger motor current is allowed to flow before the current-limiting effect commences. Furthermore, the current will in general be automatically limited to a lower value in the case of a motor having a low current rating; this is due to the fact that a motor of low current rating usually has a higher inductance than a motor of high current rating so that the back rectifier passes a larger proportion of the total motor current and will therefore start the limiting effect with a smaller total motor current. The current-limiting effect in therefore discriminatory, both as to motor speed and motor current rating.

Figure 8:
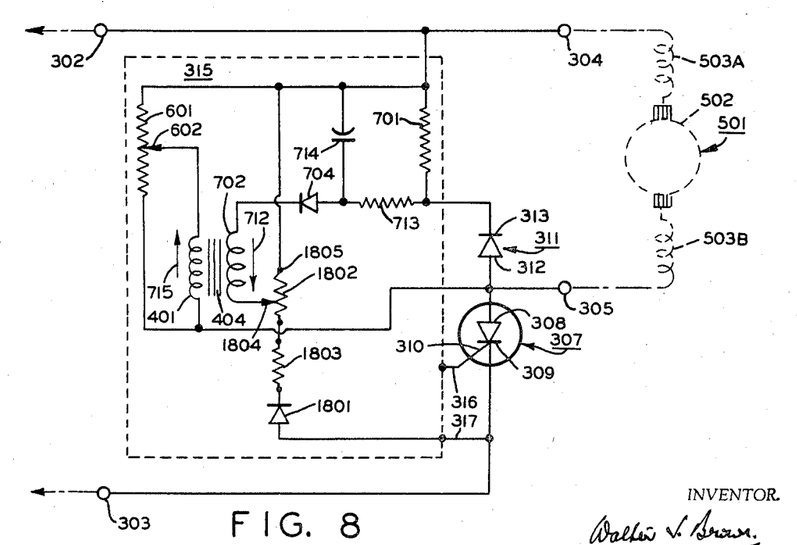
FIG. 8 is a schematic diagram showing the invention as applied to an adjustable current-limiting arrangement.

FIG. 8 is a schematic diagram of an alternative circuit for limiting the load current in dependence upon the current through the back rectifier. Many of the elements are similar to those in previous figures, and they are similarly numbered, and their descriptions will not be repeated.

In FIG. 8, the back rectifier current is sensed by the series impedance 701, and the current-sensing voltage across 701 is filtered by resistor 713 and capacitor 714, as in the case of FIG. 7. In FIG. 8, however, a unidirectional reference voltage is provided by means of the diode 1801, feeding a reference potentiometer 1802 through a series resistor 1803. An adjustable unidirectional reference voltage is thereby developed between the tap 1804 and the upper end 1805 of the potentiometer 1802. The filtered current-sensing voltage across capacitor 714 is connected in series opposition to this reference voltage through diode 704. When the current-sensing voltage exceeds the reference voltage, a current-limiting signal flows through the diode 704 and through winding 702 in the direction indicated by the arrow 712; this magnetizes the core 404 in the opposite direction to the voltage-regulating winding 401 as indicated by the arrow 715 and accordingly inhibits any further increase in load current, as described with reference to FIG. 7.

The arrangement of FIG. 8 provides for adjustment of the limiting current, by means of the potentiometer tap 1804. Furthermore, since the reference voltage supplied through the diode 1801 has a half wave rectified waveform, and the filtered current-sensing voltage across capacitor 714 approximates a half wave rectified waveform, the current-limiting effect is reasonably steep, since the envelopes of the current-sensing voltage and of the reference voltage substantially overlap each other.

Figure 9:
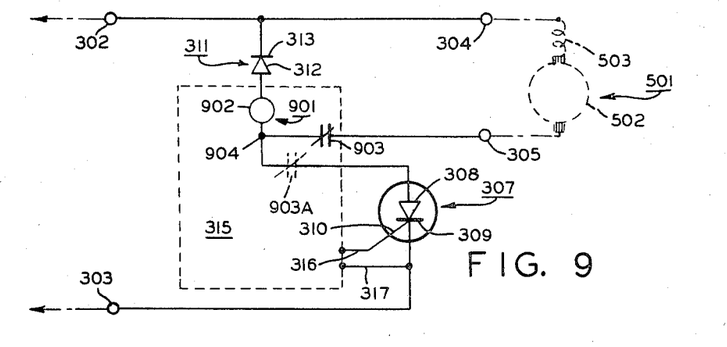
FIG. 9 is a schematic diagram showing the invention in connection with an overload relay.

FIG. 9 shows a further application of my invention to the discriminatory overload protection of series wound or universal motors, or the windings of other classes of electrical machinery, by cutting off the load current at a value corresponding to a predetermined back rectifier current. Many of the circuit elements are similar to those previously described and they are similarly numbered, so their description will not be repeated.

In FIG. 9, the back rectifier current is passed through the tripping means 902 of a switching means such as an overload relay 901; said tripping means may comprise a winding, a heater, or the control circuit of a static device such as a solid state gate controlled switch, an SCR, or a power transistor. The relay 901 is provided with circuit opening means, illustrated as a pair of normally closed contacts 903, but which may alternatively be the power circuit of a solid state static device.

Under normal load conditions, the current through the back rectifier and the tripping means 902 of the relay is insufficient to open the power circuit at 903 which, therefore, permits the total load current of the controlled rectifier 307 and of the back rectifier 311 to flow through the series wound or universal motor 501 between the output terminals 304 and 305.

However, when the back rectifier current exceeds a predetermined value, the tripping means 902 of relay 901 operates the circuit opening means 903 and interrupts the total output current to the motor. Preferably, the relay 901 is of the latching or "flip-flop" type so that the current to the motor cannot be unexpectedly restored, but requires a manual resetting operation to restart the motor.

It is unnecessary to interrupt the entire power supply to the motor, and the circuit opening means may be located in series with the controlled rectifier only, as shown by dotted lines at 903A, in which event the circuit opening means 903 can be omitted.

The arrangement of FIG. 9 is discriminatory in two ways, since the operation of the circuit opening means is dependent only upon the back rectifier current and not upon the total load current. Firstly, the circuit will be opened at a lower value of motor current at low motor speed than it will at higher motor speed, thus protecting the motor against overheating at slow speed; this effect is due to the fact that the back rectifier current amounts to a higher proportion of the motor current at low speed than at high speed. Secondly, the circuit will, in general, be opened at a lower motor current for a motor of small current rating than for a motor of large current rating since the small motor will usually have a higher inductance, so that the back rectifier passes a higher percentage of the total motor current through the tripping means.

Figure 10:
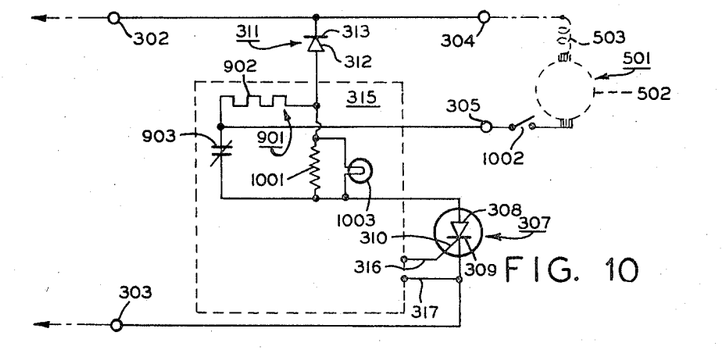
FIG. 10 is a schematic diagram showing the invention as applied to an overload relay with means for holding the relay in an energized condition after the occurrence of an overload.

FIG. 10 shows an alternative circuit for discriminatory overload protection which maintains the load circuit in a substantially open condition after tripping, until such time as the load circuit is reclosed by external means. Several of the circuit elements are similar to those previously described and they are similarly numbered, and their description will not be repeated.

In FIG. 10, the back rectifier current is passed through the tripping means 902 which preferably comprises the heater of a thermal time delay relay 901. The circuit opening means 903 comprises a pair of normally closed contacts which are opened after the back rectifier current has exceeded a given value for a given length of time. The contact pair 903 is connected in series with an output terminal 305 which is connected to the load 501, shown as a series wound or universal motor, and thence to the other output terminal 304. Accordingly, the motor circuit is effectively interrupted upon the opening of contacts 903.

In this arrangement, the resistor 1001 is connected in series with the heater 902 across the contacts 903 and is designed so as to pass sufficient current through the heater 902 to hold the contacts 903 open after they have been initially opened by an overload current. Accordingly, there is no danger of accidental restarting of the motor. It can be restarted only by manually opening a switch 1002 in series with the motor, such as the trigger switch on a hand electric tool, or alternatively by interrupting the alternating current supply to the input terminals 302 or 303; in either event it is necessary to wait for a period of time to allow the heater 902 to cool down and reclose the contacts 903 before the motor can be restarted. A pilot lamp 1003 is conveniently connected across the holding resistor 1001 to indicate when an overload has occurred and when external resetting is accordingly necessary.

Figure 11:
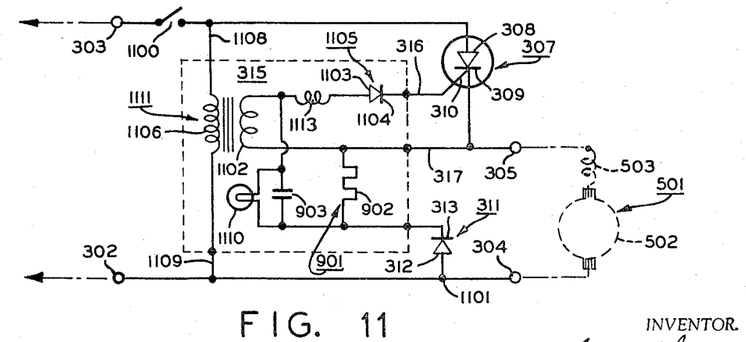
FIG. 11 is a schematic diagram showing the invention as applied to overload protection by turning off the controlled rectifier.

FIG. 11 illustrates a further arrangement for providing discriminatory overload protection, in which the output is interrupted by suppressing the firing pulse to the controlled rectifier and thus making its anode circuit nonconductive. Many of the circuit elements are similar to those previously described, and they are similarly numbered, so their description will not be repeated. The relay contacts 903 in FIG. 11 are of the normally open type.

In FIG. 11, the anode 308 of the controlled rectifier 307 is supplied from the alternating current input terminal 303 through a switch 1100. The controlled rectifier cathode 309 is connected to output terminal 305, for connection to a series wound or universal motor 501 or other inductive load. The load circuit is completed by returning through output terminal 304 to input terminal 302.

The back rectifier 311 has its anode 312 connected to output terminal 304. Its cathode 313 is connected through the relay tripping means, shown as the heater 902 of a thermal time delay relay 901, to the other output terminal 305 and to the cathode 309 of the controlled rectifier 307.

The firing pulses for initiation of conduction of the controlled rectifier are generated in windings 1102 and 1103 and are applied between the cathode 309 and gate 310 through conductor 317, windings 1102 and 1113, and through the anode 1103 and cathode 1104 of diode 1105 and conductor 316.

The energy required for developing the firing pulses is in any event drawn from the alternating current supply through terminal 303, switch 1100, transformer primary 1106, and terminal 302.

Upon the occurrence of an overload for a sufficient duration of time, the heater 902 of relay 901 closes its contacts 903, thus effectively short-circuiting the firing pulse to the gate 310 and reducing its amplitude so much as to cut off the current flowing through the controlled rectifier 307 to the load 501. The transformer 1111 has a high impedance, so that its voltage is greatly reduced upon closure of the contacts 903, so as effectively to suppress the gate firing pulses. Thereafter, the heater 902 of relay 901 remains energized by the winding 1102, so that the output to the load 501 continues to be cut off. Said output can be restored only by interrupting the alternating current supply, for instance by manually opening the switch 1100 for sufficient time to allow the heater 902 to cool down and permit reopening of the contacts 903 of relay 901. After sufficient time has elapsed for the relay contacts 903 to open, the output current can be restored by manually reclosing the alternating current supply. If desired, a pilot lamp 1110, or other signaling device, of low current rating may be connected across the relay contacts 903 to show when the system is in an operative condition.

The circuits of FIGS. 10 and 11 both discriminate between large or small motors running at high or low speeds by varying the tripping current in accordance with the inductance of the motor and with the voltage supplied to the motor, as described with reference to FIG. 9.

Figures 12, 13:
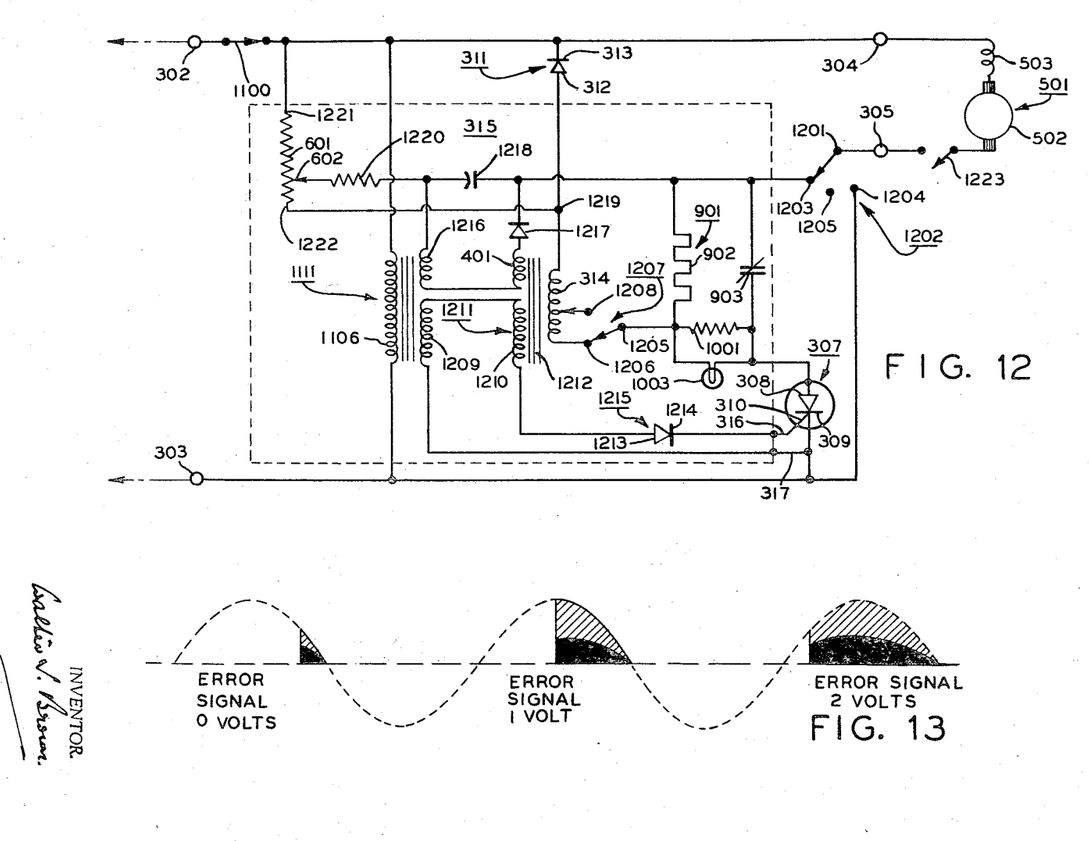
FIG. 12 shows schematically a complete circuit for speed regulation and overload protection of a series wound or universal motor.
FIG. 13 is a diagram of the typical waveforms of the firing pulses and anode currents in a controlled rectifier.

FIG. 12 details a complete adjustable speed drive including a universal motor and a closed loop control system providing for adjustment and regulation of the motor speed, and including overload protection which discriminates by tripping out at a low RMS motor current at slow speed or with a small motor, while tripping out at a higher RMS motor current at high speed or with a larger motor.

Many of the circuit elements are similar to those previously described, and they are similarly numbered, so their description will not necessarily be repeated.

In FIG. 12, the functions outlined above are performed in accordance with the current through the back rectifier 311, which current flows from the inductive field winding 503 of the motor 501, then through its armature 502 to the output terminal 305 and the common point 1201 of the switch 1202 and to one of its contacts 1203. It then flows through the heater 902 of the thermal time delay relay 901 to the common point 1205 and contact 1206 of the switch 1207 and up through the winding 314 to the anode 312 and carbode 313 of the back rectifier 311, and thence to the output terminal 304, from which it returns to the motor field winding 503.

The flow of back rectifier current through winding 314 on magnetic core 1212 is in such a direction as to advance the firing angle of the gate 310 and to increase the output of the controlled rectifier 307 to compensate for the increased load requirements.

The firing pulses are generated by a magnetic amplifier arrangement which is energized by the primary winding 1106 of a transformer 1111, said primary being connected to the alternating current supply at terminals 302 and 303 through switch 1100. The pulse energy is supplied from the secondary winding 1209 of transformer 1111, and a steeply rising leading edge of the pulse is developed by connecting said winding 1209 in series with a winding 1210 of a saturable transformer 1211 having a core 1212 of "square loop" magnetic material which saturates very sharply, such as the materials having the trade names of Orthonol, Deltamax and Squaremu. The resulting shaped pulse is then applied between cathode 309 and gate 310 of controlled rectifier 307 through the anode 1213 and cathode 1214 of a diode 1215.

The timing, or phase angle, of the leading edge of the firing pulse in each alternate half cycle is determined by singal currents in the windings 401 and 314 of the saturable transformer 1211. Winding 401 is a voltage-sensitive winding which is connected in series with an alternating current biasing winding 1216 and in series with a diode 1217 across the terminals of a large capacitance, low voltage capacitor 1218. The effect of this magnetic amplifier circuit is to deliver pulses with a steeply rising wavefront, the phase angle of which varies with small voltage variations of error signal across the capacitor 1218 as shown in FIG. 13.

A speed-controlling potentiometer 601 is connected across the back rectifier 311. A variable tap 602 on the potentiometer 601 is connected through a resistor 1220 and through capacitor 1218 and switch 1202 to the output terminal 305, thence through the switch 1223, the motor 501, output terminal 304, to the upper end 1221 of potentiometer 601. This circuit path acts as a closed loop system, tending to maintain the motor voltage equal to the voltage between th end 1221 and the tap 602 on the potentiometer 601, with only a small error signal across the capacitor 1218. Accordingly, the motor voltage and speed can be increased by sliding the tap 602 down toward the lower end 1222 of potentiometer 601. Furthermore, as the current through the back rectifier 311 increases, due to increased load on the motor, the unidirectional voltage component across said rectifier increases and this in turn increases the total voltage across the potentiometer between its ends 1221 and 1222; accordingly, the unidirectional voltage component from the potentiometer end 1221 to its tap increases, and the voltage delivered to the motor increases so as to maintain a small error signal across capacitor 1218, thus tending to regulate the motor speed by increasing its voltage when its load current increases.

A major increase in motor voltage when its load increases is additionally produced by passing the back rectifier current through the winding 314 on the core 1212 of the saturable transformer 1211. By using a suitable number of turns on this winding 314, the firing angle may be caused to advance as rapidly as desired with increase of back rectifier current so as to maintain a reasonably constant speed with varying load, especially at slow speeds and well retarded phase angles when the back rectifier current amounts to a large proportion of the total motor current.

Furthermore, I have found that this arrangement will discriminate between a wide range of motor ratings; since a low current motor has in general more inductance than a high current motor, the back rectifier current reaches a given value so as to produce a given advance in firing angle at a lower total motor current for a low current motor than for a high current motor; accordingly, the circuit discriminates between the firing angle advance required by low current and by high current motors.

However, in cases where an unusually wide range of motors must be controlled, the current-sensing winding 314 may be provided with taps connected to the contacts 1206 and 1208 of a selector switch 1207.

FIG. 12 also includes a discriminatory overload protective circuit comprising a thermal time delay relay 901 having its heater 902 in series with the back rectifier and having normally closed contacts 903 in series with the anode circuit of the controlled rectifier 307. Accordingly, this overload relay will trip out at a particular value of RMS current through the back rectifier. This discriminates between different motor speeds by tripping out at a lower motor current when running slowly than when running fast. Furthermore, it discriminates between motor ratings by tripping out at a lower motor current with a motor rated at lower current on account of its higher inductance.

A resistor 1001 is provided across the relay heater 902 and its contacts 903, so that as soon as the relay contacts 903 have opened, the heater 902 is left in circuit in series with the motor, the resistor 1001 and the controlled rectifier 307. The value of the resistor 1001 is chosen to maintain sufficient current through the heater 902 to keep the contacts 903 open, until the relay is externally reset by interrupting either the A.C. input at switch 1100 or the D.C. output switch 1202, or a trigger switch 1223 attached to the motor housing. The circuit must be interrupted for sufficient time to allow the relay heater 902 to cool down sufficiently for its contacts 903 to reclose, after which normal operation may again be obtained by restoring the switch or switches to their closed position. A pilot lamp 1003 is conveniently connected across the resistor 1001 to indicate when the relay 901 has cut off the motor due to an overload.

The switch 1202 may provide for connecting the motor 501 to the variable output at contact 1203, or alternatively to the full alternating line voltage at contact 1204, or alternatively for cutting off the supply to the motor and resetting the overload circuit, at contact 1205.

FIG. 13 shows the typical waveforms of the firing pulses applied to the controlled rectifier gate 310 in solid black and the load voltage delivered by the controlled rectifier as cross-hatching, in relation to the alternating voltage supply shown in dotted lines. The numerals below the curves show typical values of D.C. error signal voltage applied across the capacitance 1218 of FIG. 12 required to produce the firing angles depicted in FIG. 13.

Figure 14:
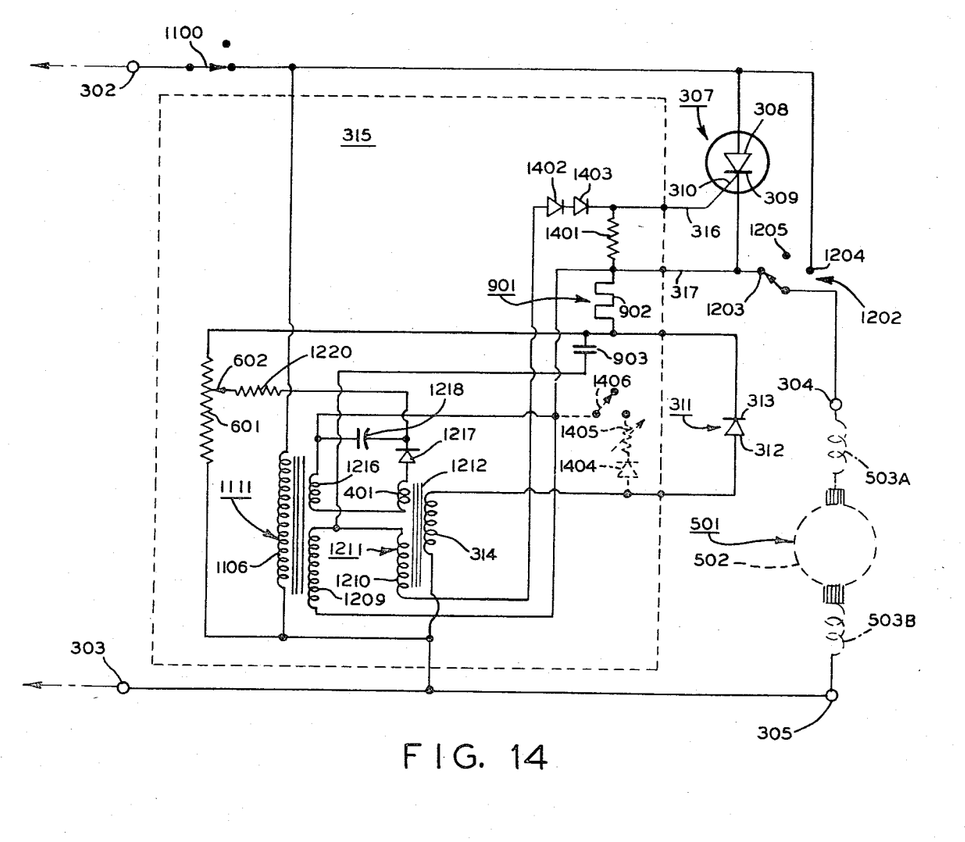
FIG. 14 shows schematically a complete circuit for speed regulation and overload protection by turning off the controlled rectifier.

FIG. 14 is a circuit diagram of an adjustable speed drive having an alternative form of discriminatory overload protection in which the load current is cut off under overloaded conditions by removing the firing pulse from the controlled rectifier so that the overload relay contacts need to handle only the small currents associated with the firing pulse, and do not need to handle the main load current. Many of the circuit elements are similar to those previously described, and they are similarly numbered and their descriptions will not be repeated.

In FIG. 14, the heater 902 of the thermal time delay relay 901 is again connected in series with the back rectifier 311. However, the relay contacts 903 are of the normally open type, and they are connected in series with the heater across the secondary winding 1209 of transformer 1111 which supplies the firing pulse energy. This virtually short circuits the winding 1209, which preferably has a high reactance, and reduces the amplitude of the firing pulses sufficiently to make them ineffective and thus to turn off the controlled rectifier 307 and cut off the current to the load; to ensure that the pulse amplitude is sufficiently reduced, a resistor 1401 is connected from gate to cathode of the silicon controlled rectifier 307, and two silicon diodes 1402 and 1403 are preferably connected in series with the gate 310 so as to reduce the pulse amplitude by an amount equal to the forward voltage drop in both diodes.

As soon as the relay contacts 903 have closed, due to an overload, and rendered the gate pulse ineffective, the heater 902 is connected through its contacts 903 across the transformer secondary 1209, which is suitably designed to maintain sufficient current through the heater to hold the contacts 903 closed and prevent restoration of the firing pulses and of the load current; the load current can be restored only by opening the alternating current supply, for instance at switch 1100, and then reclosing it after the heater 902 has cooled down.

Instead of short circuiting the gate by means of the relay 901, this may be accomplished by a transistor together with a suitable resistance-capacitance time delay circuit.

The circuit of FIG. 14 has been found to operate with sufficient discrimination to protect motors having RMS ratings between 1 and 3 amperes against their individual overload ratings. In order to protect larger motors, or to provide an overload adjustment, an additional back rectifier 1404 may be connected in series with a resistor 1405 and a switch 1406 across the heater 902 and the back rectifier 311; the current through to the additional back rectifier 1404 does not pass through the heater, but it is dependent upon the load current; accordingly, the resistor 1405 may be varied to adjust the total value of load current at which the heater 902 passes sufficient current to close its contacts and turn off the controlled rectifier.

While the foregoing description is specific to a half wave controlled rectifier circuit, it will be apparent to those skilled in the art that more elaborate rectifier circuits could be substituted without deviating from the broad principle described.

What I claim is:

1. A control system having an input for connection to an alternating current source and having an output for connection to an inductive load comprising: at least one controlled rectifier arranged for connection to the source and for providing an output to the load responsive to the firing angle of pulses applied to said controlled rectifier for initiating its conduction; control means coupled to said controlled rectifier for delivering and varying the firing angle of pulses; a back rectifier arranged for connection across at least a part of said load and at least partially in series with a switching means for causing said switching means to be responsive to the current flowing through said back rectifier and operating substantially to cut off the output of the system when the back rectifier current exceeds a predetermined value.

2. The combination of claim 1, in which the effective output to the load is disconnected in response to the operation of said switching means.

3. The combination of claim 1, in which the controlled rectifier output only is disconnected upon operation of said switching means.

4. The combination of claim 1, in which the firing pulses are substantially suppressed in response to the operation of the switching means, whereby the controlled rectifier ceases to deliver an output to the load.

5. The combination of claim 1, which includes a holding current circuit and in which said switching means substantially cuts off the output to the load and simultaneously renders effective the holding current circuit for maintaining said switching means in an energized condition, whereby to inhibit output to the load.

6. The combination of claim 1, including an impedance, in which, upon operation of said switching means, the output to the load remains connected through said impedance; said impedance passing sufficient current to hold said switching means in an energized condition.

7. The combination of claim 1, in which said switching means is thermally energized by a heater connected in series with said back rectifier.

8. The combination of claim 1, in which the switching means includes contacts which are opened upon operation of said switching means; and a resistor is connected across said contacts; the current through said resistor being sufficient to hold said switching means in an energized condition until the system is externally disconnected.

9. The combination of claim 8, in which said resistor includes a signaling device; said signaling device indicating the condition when it is necessary to disconnect the system externally in order to restore its normal power output.

References Cited

UNITED STATES PATENTS

| | | | |
|---|---|---|---|
| 3,064,174 | 11/1962 | Dinger | 318—345 XR |
| 3,176,212 | 3/1965 | De Puy | 321—18 XR |
| 3,225,280 | 12/1965 | Happe et al. | 317—13 XR |
| 3,230,437 | 1/1966 | Cappello | 318—345 XR |
| 3,271,648 | 9/1966 | Weed | 318—345 XR |
| 3,283,235 | 11/1966 | Auld et al. | 318—345 XR |
| 3,377,536 | 4/1968 | Bacquart | 318—345 XR |

JOHN F. COUCH, *Primary Examiner.*

W. M. SHOOP, *Assistant Examiner.*

U.S. Cl. X.R.

317—13, 43; 318—331, 345; 321—16